United States Patent [19]

Ozaki et al.

[11] Patent Number: 4,736,315

[45] Date of Patent: Apr. 5, 1988

[54] APPARATUS FOR EVALUATING DENSITY AND EVENNESS OF PRINTED PATTERNS

[75] Inventors: Tohru Ozaki; Takashi Toriu; Hiromichi Iwase, all of Kawasaki, Japan

[73] Assignee: Fujitsu Limited, Kanagawa, Japan

[21] Appl. No.: 722,559

[22] Filed: Apr. 12, 1985

[30] Foreign Application Priority Data

Apr. 13, 1984 [JP] Japan .................................. 59-74521
Jun. 21, 1984 [JP] Japan ................................ 59-127827
Dec. 21, 1984 [JP] Japan ................................ 59-270437
Mar. 12, 1985 [JP] Japan .................................. 60-48897

[51] Int. Cl.$^4$ ........................................... G03G 15/00
[52] U.S. Cl. .................................. 364/582; 356/355; 356/432; 364/518; 355/14 D
[58] Field of Search .................... 364/582, 518, 521; 346/1.1, 33 A; 356/432–435, 355; 355/14 D; 340/723, 728, 729, 731

[56] References Cited

U.S. PATENT DOCUMENTS

| | | | |
|---|---|---|---|
| 3,842,422 | 10/1974 | Vanden Broek et al. | 364/582 X |
| 4,005,434 | 1/1977 | Golias et al. | 364/582 X |
| 4,468,703 | 8/1984 | Fujiwara et al. | 382/51 X |
| 4,556,916 | 12/1985 | Matsunawa | 358/280 X |
| 4,572,654 | 2/1986 | Murai et al. | 355/14 D |
| 4,573,798 | 3/1986 | Fujie et al. | 356/432 |
| 4,578,712 | 3/1986 | Matsunawa | 358/282 |

*Primary Examiner*—Gary V. Harkcom
*Assistant Examiner*—H. R. Herndon
*Attorney, Agent, or Firm*—Armstrong, Nikaido, Marmelstein & Kubovcik

[57] ABSTRACT

An apparatus for evaluating density-evenness of patterns printed on an article includes a circuit for calculating density distribution of the image data in each segment; a circuit for normalizing the density distribution with an area of effective image data in each segment; and a circuit for quantifying the density and evenness of the patterns.

15 Claims, 24 Drawing Sheets

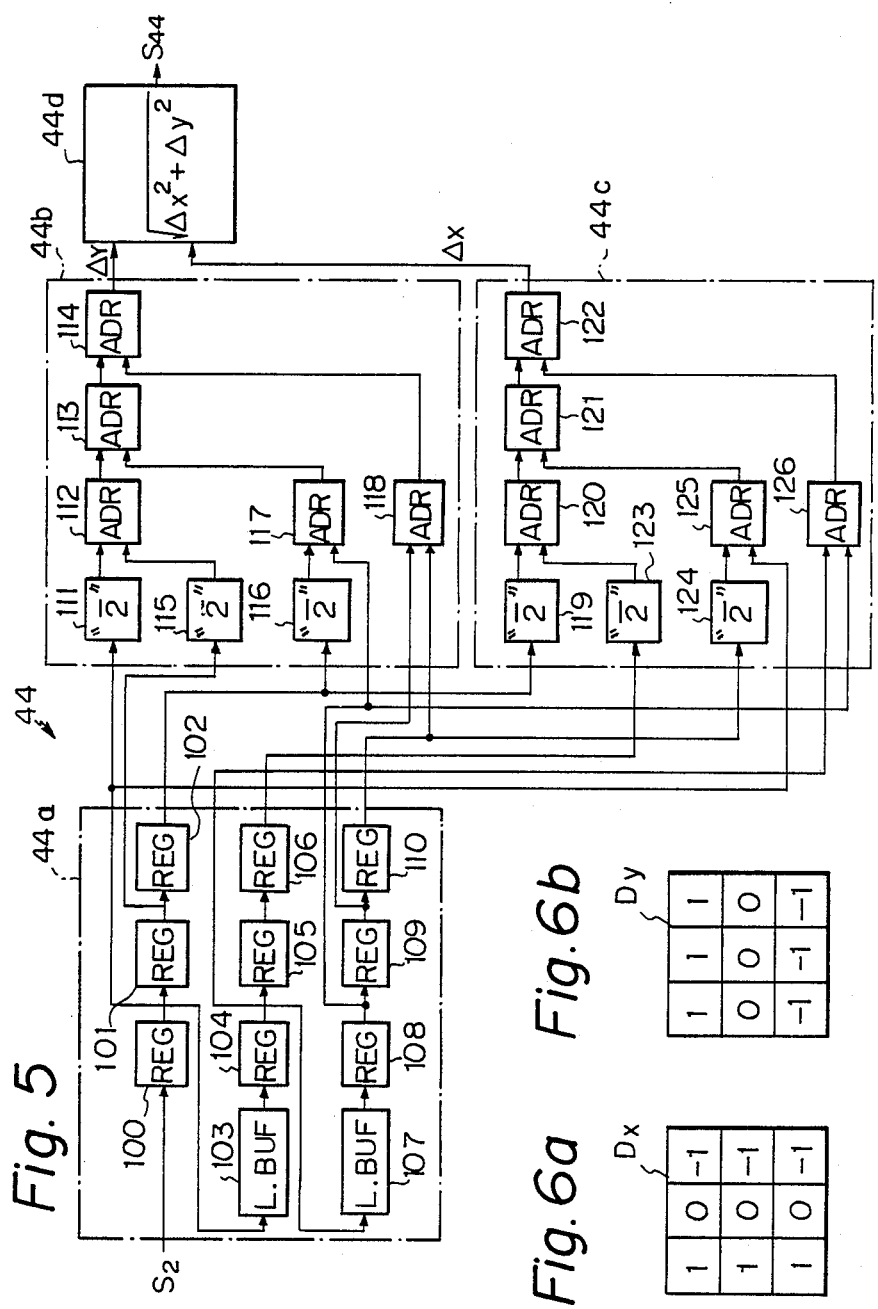

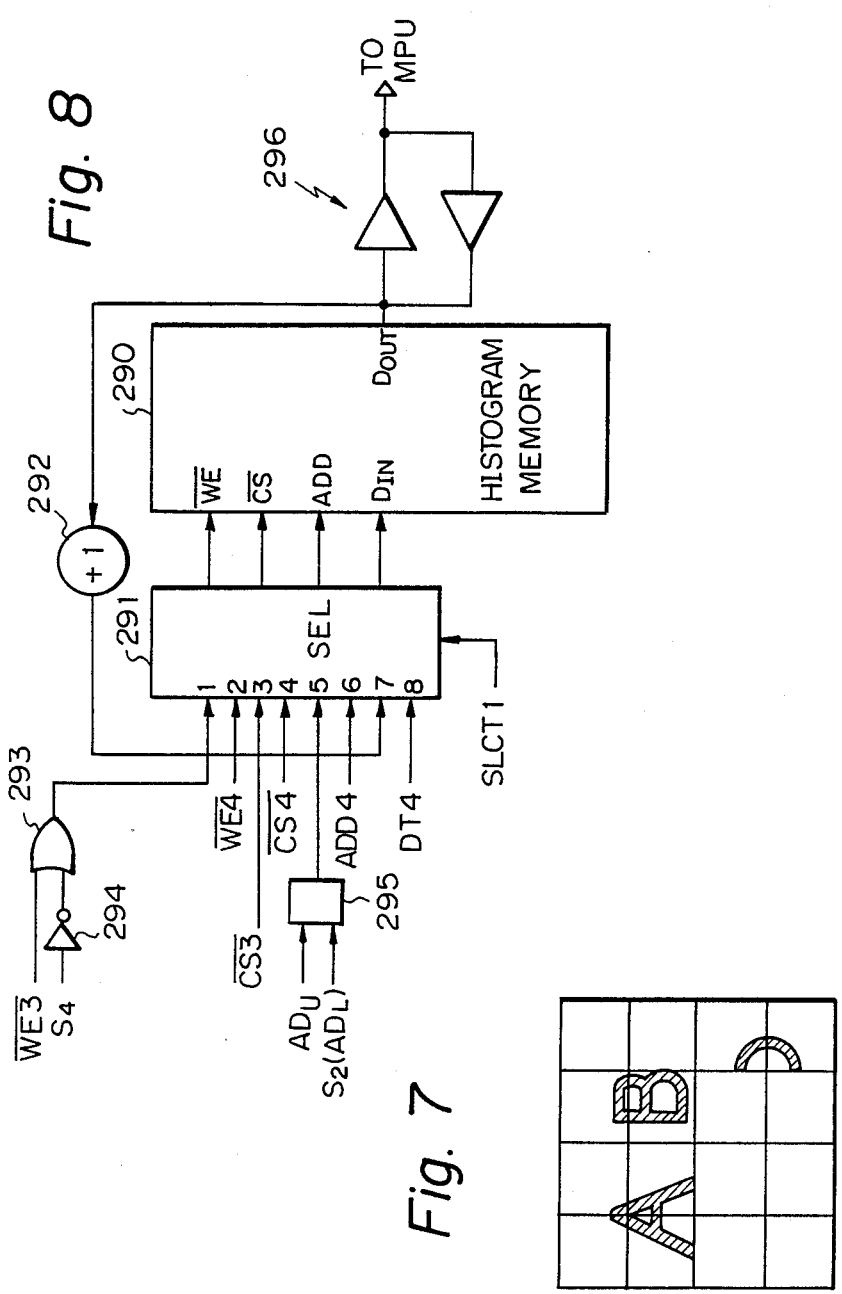

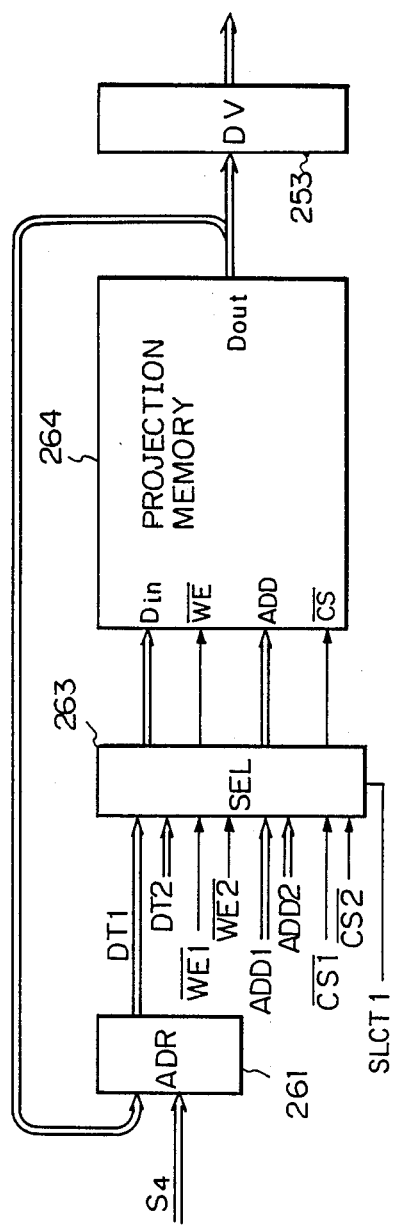

Fig.25a

| $C_{11-1}$ | $C_{12-1}$ | $C_{13-1}$ | |
|---|---|---|---|
| $C_{21-1}$ | $C_{22-1}$ | $C_{23-1}$ | |
| | | | $C_{34-1}$ |
| | | | $C_{44-1}$ |

$\Delta C_1 = |C_{max} - C_{min}|_1$

Fig.25b

| $C_{11-2}$ | $C_{12-2}$ | $C_{13-2}$ | |
|---|---|---|---|
| $C_{21-2}$ | $C_{22-2}$ | $C_{23-2}$ | |
| | | | $C_{34-2}$ |
| | | | $C_{44-2}$ |

$\Delta C_2 = |C_{max} - C_{min}|_2$

Fig.25c

| $C_{11-3}$ | $C_{12-3}$ | $C_{13-3}$ | |
|---|---|---|---|
| $C_{21-3}$ | $C_{22-3}$ | $C_{23-3}$ | |
| | | | $C_{34-3}$ |
| | | | $C_{44-3}$ |

$\Delta C_3 = |C_{max} - C_{min}|_3$

Fig. 28

| $F_{i-1, j-1}$ | $F_{i, j-1}$ | $F_{i+1, j-1}$ |
|---|---|---|
| $F_{i-1, j}$ | $F_{i, j}$ | $F_{i+1, j}$ |
| $F_{i-1, j+1}$ | $F_{i, j+1}$ | $F_{i+1, j+1}$ |

Fig. 29

|  |  |  |
|---|---|---|
|  | $G_{i, j}$ |  |
|  |  |  |

APPARATUS FOR EVALUATING DENSITY AND EVENNESS OF PRINTED PATTERNS

BACKGROUND OF THE INVENTION

1. Field of the Invention

The present invention relates to an apparatus for evaluating the density (lightness/darkness) and evenness of density of a pattern printed on an article, more particularly to an apparatus for detecting the density of printed patterns, for example, printed letters and marks, and then evaluating the evenness thereof.

2. Description of the Related Art

In the manufacture of integrated circuits (IC), etc., information consisting of, for example, a model code, a manufacturing lot number, and a manufacturing date is normally printed on an outer surface of a housing just after manufactured or before shipping so as to identify the IC device, etc. The printing is normally effected by an automatic printing machine or a stamp. The information is essential for discrimination of devices in testing and assembly into printed circuit boards as well as for controlling the quality of lots of such devices. Consequently, the information must remain legible over a long period.

Many apparatuses have been proposed to inspect the information printed on the housing, particularly to investigate the density of the printed information and the evenness thereof. If an IC device is printed with insufficient density or evenness of information, that device may be detected and rejected before, for instance, testing or shipping.

A paper "A Machine Vision System for Inspection of Keyboards" by J. Wilder, appearing in Signal Processing, May 1983, pages 413 to 421, deals with a system which, as a major task, can verify that each location on a keyboard contains correct, properly oriented key and that the graphics are not badly distorted. The system functions to process shading (density) by executing filtering, intensity measurement, edge extraction, feature extraction, and multi-frame averaging. In order to realize the above processing, the system includes image-input means, means for converting the input image into binary-coded image data, and means for comparing the binary-coded image data with a predeterminal reference pattern stored in a memory.

The paper, however, does not disclose the signal processing to an extent enabling understanding by others. In addition, the system is of an absolute type wherein the reference pattern is previously fixed. As a result, the system does not operate stably in the face of changes in illumination or noise. It is also difficult and complicated to determine the fixed reference pattern to obtain reliable results.

Japanese Unexamined Patent Publication (Kokai) No. 55-13453 discloses an apparatus for inspecting the print on an article monitoring a printing ribbon and a printing head in a cash dispenser, etc. The apparatus includes an image-input device, a discriminating-converting device, counting means, a memory device, and first and second judgement means. The discriminating-converting device discriminates input image signals with a plurality of reference levels and converts the discriminated signals to coded signals to obtain a plurality of discriminated level signals corresponding to the density of the printed pattern. The counting means counts the number of discriminated levels in a horizontal sweep direction, i.e., X direction to eliminate noise and/or needless data, and thereby, enable reduction of the memory size. The first judgement means verifies effective discriminated level signals. The second judgement means compares the effective discriminated level signals with a predetermined reference pattern to output either a "good" or "bad" signal. The apparatus is also of an absolute type, however, so suffers from the same disadvantages as mentioned above.

Japanese Unexamined Patent Publication (Kokai) No. 55-157078 discloses a method for finding a faulty pattern. The method includes the steps of extracting a plurality of positional data by shifting input image data by certain increments with respect to a center portion (pixel) to be measured; comparing the positional data with a predetermined reference pattern; and outputting either a "good" or "bad" signal. The method is an absolute type, so has the same disadvantages set forth above.

Japanese Unexamined Patent Publication (Kokai) No. 58-168185 discloses an apparatus for judging a mark applied on an outer surface of an electric bulb which can detect deposition of dirt, partial erasure, and uneven density of marks thereon. This also suffers from the same disadvantages.

SUMMARY OF THE INVENTION

It is an object of the present invention to provide an apparatus for detecting the density and evenness thereof of printed patterns with a high reliability irrespective of changes in illumination and noise.

It is another object of the present invention to provide an apparatus which does not require difficult and complex setting or adjusting of parameters.

It is still another object of the present invention to provide an apparatus formed with a simple circuit configuration and operating at a high speed.

According to the present invention, there is provided an apparatus for evaluating density and evenness of patterns printed on an article including: a circuit for calculating the density distribution of a plurality of image data in each segment, a circuit for normalizing the density distribution with an area of effective image data in each segment, and a circuit for quantifying the density and evenness of the patterns.

BRIEF DESCRIPTION OF THE DRAWINGS

Other objectives and features of the present invention will be described below in detail with reference to the accompanying drawings, in which:

FIG. 5 is a circuit diagram of a differential circuit shown in FIG. 1;

FIGS. 6a and 6b are views of filtering parameters for explaining the operation of the differential circuit;

FIG. 7 is a view of examples of letter patterns extracted in a letter-pattern extraction circuit shown in FIG. 1;

FIGS. 8 and 9 are circuit diagrams of a density histogram calculation circuit shown in FIG. 1;

FIGS. 16 and 17 are circuit diagrams of the projection calculation circuit 61 shown in FIG. 1;

FIGS. 25a to 25c are views of evenness coefficient maps used at the evenness judgement calculation circuit;

FIG. 28 is a view of a pixel data array;

FIG. 29 is a view of a data array output from the circuits shown in FIG. 27;

DESCRIPTION OF THE PREFERRED EMBODIMENTS

Figure 1:
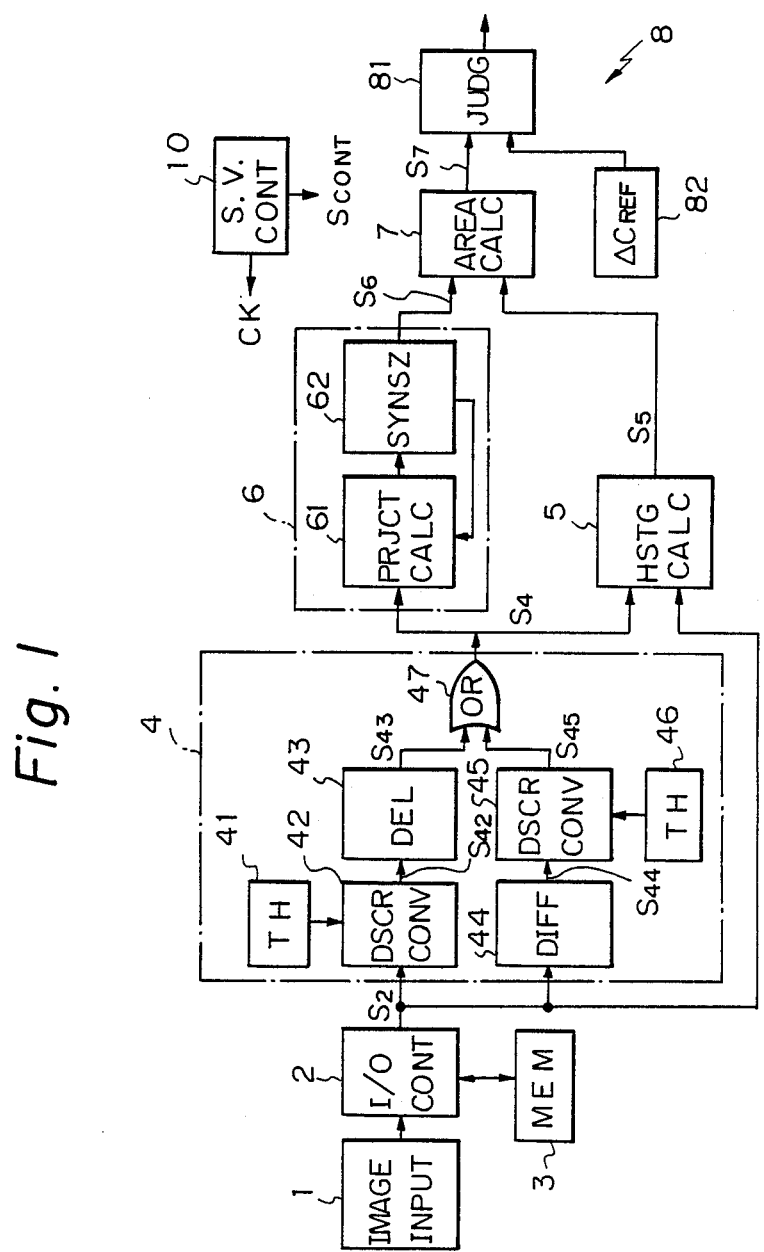
FIG. 1 is a block diagram of an embodiment of an apparatus for detecting density of printed patterns and evenness thereof in accordance with the present invention.

FIG. 1 is a block diagram of an embodiment of an apparatus for detecting density and evenness of printed patterns in accordance with the present invention. In FIG. 1, the apparatus includes an image-input device 1, an input and output (I/O) controller 2, a memory device 3, a letter-pattern extracting circuit 4, a density histogram calculation circuit 5, a circuit 6 for deciding a segment region to be judged, a circuit 7 for calculating the area of the letter pattern in the segment region to be judged, a judgement circuit 8, and a supervisory (SV) controller 10.

The SV controller 10 provides a common clock signal CK to the other circuits mentioned above and controls the operation of the circuits by outputting a control signal $S_{CONT}$. For simplification of the drawings, the wiring of the clock signal CK and the control signal $S_{CONT}$ are omitted.

Figure 2:
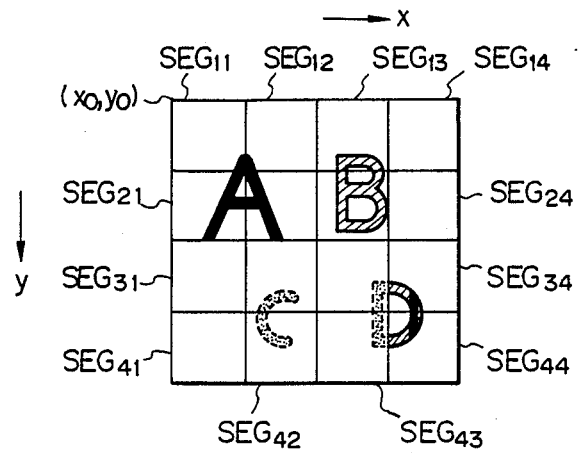
FIG. 2 is a view of examples of printed letter patterns whose density and evenness are to be detected.

FIG. 2 is a view of examples of letter-patterns printed on an outer surface of a housing of an IC device. The printed patterns consist of letters "A", "B", "C", and "D". The letter "A" is printed clearly, darkly, and evenly. The letter "B" is printed evenly and considerably clearly, but somewhat lightly. The letter "C" is printed evenly, but lightly and unclearly. The letter "D" is printed unevenly, having a left portion printed lightly and unclearly, a middle portion printed somewhat lightly but clearly, and a right portion printed clearly and darkly.

Figure 3:
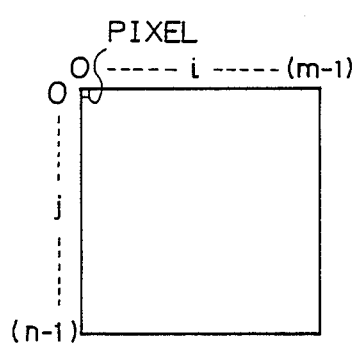
FIG. 3. is a view of a segment and pixel arrangement in the segment.
Figure 4:
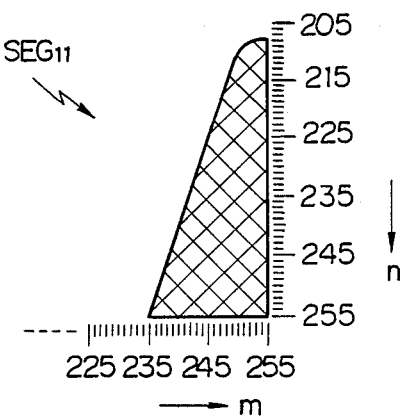
FIG. 4 is an enlarged partial view of the segment $SEG_{11}$ in FIG. 2.

The printed portion shown in FIG. 2 provisionally divided into a plurality of segments $SEG_{MN}$, i.e., in the embodiment, $SEG_{11}$, $SEG_{12}$, ... $SEG_{44}$, in a matrix form. Each segment is further provisionally divided into m sections along the ordinate and n sections along the abscissa to define m x n pixels, as shown in FIG. 3. In the embodiment, m and n are both 256. FIG. 4 is a specific and enlarged view of the segment $SEG_{11}$ in FIG. 2.

The image-input device 1 is, for example, a video television (TV) camera which scans the printed portion shown in FIG. 2, reads the printed letters "A", "B", "C", and "D" and outputs electrical signals each having a discrete density-degree (gradient) corresponding to the density in the pixel. The maximum density-degree is 255 is this embodiment.

The I/O controller 2 receives discrete density-degree signals from the image-input device 1 and stores them in a corresponding segment data area in the memory device 3. In the memory device 3, each image data has a length of eight bits for indicating the maximum density-degree. For example, the density-degree is 200 for the density of the letter "A", 100 for that of the letter "B", 50 for that of the letter "C", and 0 for that of the blank portion. Preferably, image data smaller than a predetermined density-degree, for example, 25, is not stored in the memory device 3 so as to enable reduction of the memory size of the memory device 3.

Referring back to FIG. 1, the letter-pattern extraction circuit 4 consists of a density-threshold holding register 41, a discriminating-converting circuit 42, a delay circuit 43, a discrete-type differential circuit 44, another discriminating-converting circuit 45, a differential-threshold holding register 46, and an OR gate 47.

The letter-pattern extraction circuit 4 receives as input the image-input data stored in the segment data area in the memory device 3 by way of the I/O controller 2. The image-input data, on one hand, is discriminated as to its density by the discriminating-converting circuit 42 and, on the other hand, is edge-extracted by the differential circuit 44, the edge-extracted signals then being discriminated by the discriminating-converting circuit 45. Generally, differential calculation by the differential circuit 44 and the discrimination by the circuit 45 require a longer time than the discrimination by the circuit 42. Thus, the delay circuit 43 delays, an output signal $S_{42}$ of the discriminating-converting circuit 42 by a predetermined time to synchronize it with an output signal $S_{45}$ from the discriminating-converting circuit 45. As clearly understood, the output signal S$_{42}$ has a logical high level, i.e., "1", when the density-degree of the image input data at a certain pixel is higher than a predetermined value, for example, 75, if low-density data like the letter "C" in FIG. 2 is input, the output signal S$_{42}$ is set to a logical low level, i.e., "0". Also, the output signal S$_{45}$ has a logical high level when the differential value at a certain pixel is higher than a predetermined value, which enables detection of an edge of the letter. The OR gate 47 inputs both output signals S$_{43}$ and S$_{45}$ and outputs an OR'ed binary signal S$_4$.

The discriminating-converting circuit 42 includes a digital-type comparator (not shown). The density-threshold holding register 41 holds the above-mentioned threshold value, i.e., 75. The discriminating-converting circuit 42 inputs the image-input signal S$_2$ and the threshold value and outputs a logical-high level signal S$_{42}$ when the density-degree of the image-input signal S$_2$ is greater than the threshold value. The threshold value held in the register 41 can be easily changed.

FIG. 5 is a circuit diagram of the differential circuit 44. In FIG. 5, the differential circuit 44 consists of a line buffer circuit 44a, an Y-direction filtering circuit 44b, a X-direction filtering circuit 44c, and a square-average calculation circuit 44d.

The line buffer circuit 44a consists of registers 100 to 102, a line buffer 103, registers 104 to 106, a line buffer 107, and registers 108 to 110. The registers are arranged to form a 3×3 matrix. Each register has a bit length equal to that of the maximum density-degree, i.e., eight bits. Each line buffer has a capacity tor storing all pixel image-input data in an X-directional line. In the initial condition, these registers and line buffers are cleared. When the image-input data, S$_2$ is input, it is held at the first register 100. When the next image-input data S$_2$ is supplied to the register 100, the previously stored data is shifted to the register 101, the line buffer 103, and the following circuits 44b and 44c. The image-input data is similarly continuously supplied to the line buffer circuit 44a and stored in the registers 100 to 102, 104 to 106, and 108 to 110. As a result, the image-input data at a center pixel whose differential value is to be calculated is stored in the center register 105 and the other image-input data at peripheral pixel with respect to the center pixel are stored in the other registers 100 to 102, 104, 106, and 108 to 100 to form a 3×3 matrix. The output signals of the registers, except the center register 105, are supplied to the filtering circuits 44b and 44c.

The Y-direction filtering circuit 44b consists of circuits 111, 115 and 116, for calculating a "complement of two" for the output signals from the line buffer circuit 44a, and adders 112 to 114 and 117 and 118. The Y-direction filtering circuit 44b calculates a differential value Δy of density, with respect to the center pixel, with the parameter of the Y-direction position, i.e., the length of the pixel in the Y direction.

The X-direction filtering circuit 44c has the same configuration as that of the Y-direction filtering circuit 44b. The circuit 44c calculates a differential value Δx with the parameter of a X-direction position.

From the above-mentioned explanation, it will be clear that the differential value Δx is equivalent to the result of filtering of the image-input data S$_2$ with 3×3 filtering parameters D$_X$, as show in FIG. 6a. The differential value Δy is equivalent to the result of filtering of the image-input data S$_2$ with 3×3 filtering parameters D$_y$, as shown in FIG. 6b.

The square-average calculation circuit 44d receives the differential values Δx and Δy and calculates a differential average value Δ:

$$\Delta = \sqrt{x^2 + y^2} \tag{1}$$

Thus, the differential average value Δ, that is, the signal S$_{44}$, indicates the average value for two differential values Δx and Δy with respect to the center pixel. The differential average value is generally high where the center and adjacent pixels include the edge of a letter and are thus uneven in density and low where they are completely occupied by part of a letter and are thus even in density or where they are blank. Accordingly, the differential average value ∴ contributes to distingushing edges or outlines of letters.

The second discriminating circuit 45 and the differential-threshold holding register 46 are similar to the circuits 42 and 41, respectively.

FIG. 7 is a view of examples of letter patterns extracted by the letter extraction circuit 4. In FIG. 7, shaded portions are logical-high level.

Referring again to FIG. 1, the density histogram calculation circuit 5 will be explained. The density histogram calculation circuit 5 receives the image-input signal S$_2$ and the letter-patterned extracted signal S$_4$ and calculates a density histogram of the image-input data corresponding to the letter-pattern extracted portion. The density histogram calculation is effected for each segment divided as shown in FIG. 2.

Figure 9:
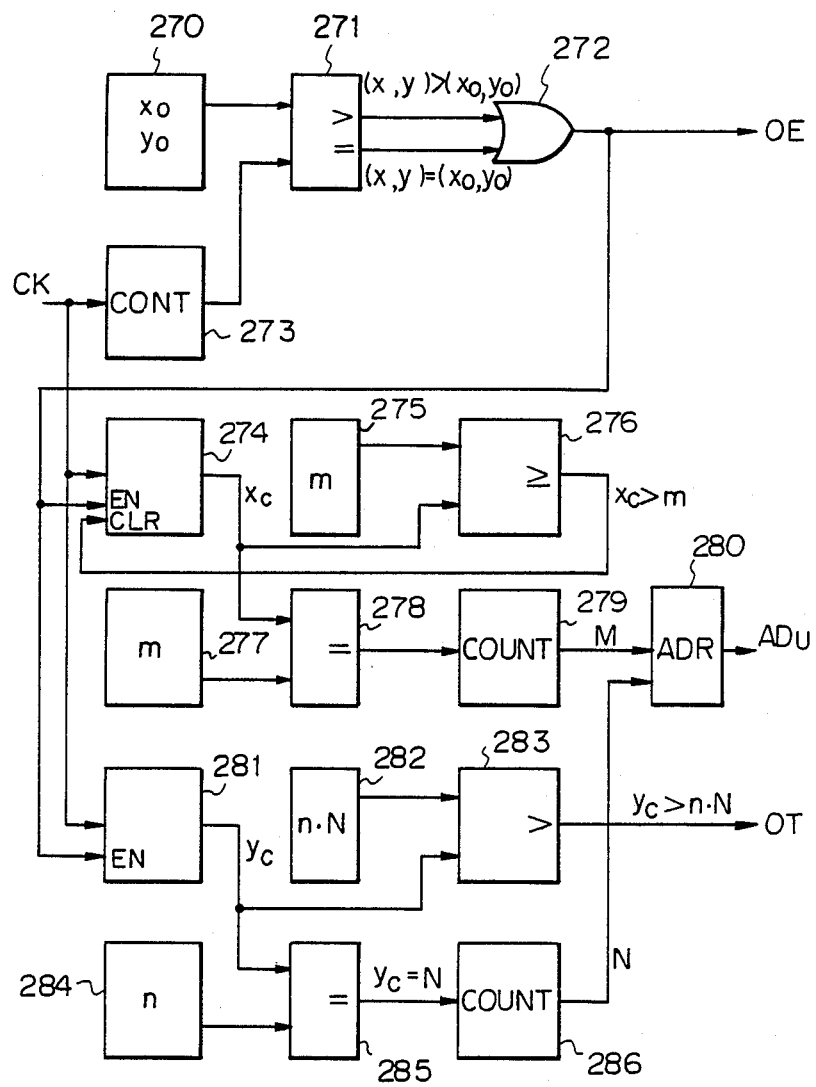

FIGS. 8 and 9 are circuit diagrams of the density histogram calculation circuit 5. In FIG. 8, the circuit 5 includes a histogram memory device 290, a selector 291, an increment circuit 292, an OR gate 293, an inverter 294, an address signal synthesizing circuit 295, and a tristate buffer 296 for connection to a microprocesser unit (MPU), explained later with reference to FIG. 18. The circuit shown in FIG. 8 receives memory control signals from the SV controller 10: a write enable signal $\overline{WE3}$ applied to the OR gate 293 and a chip select signal $\overline{CS3}$. The circuit shown in FIG. 8 also receives the letter-pattern extracted signal S$_4$ at the inverter 294 and the image-input signal S$_2$ at the address synthesizing circuit 295. The circuit shown in FIG. 8 further receives control signals, i.e., a write enable signal $\overline{WE4}$, a chip select signal $\overline{CS4}$, and an address signal signal ADD4 and data signal DT4 from the MPU to optionally and selectively access the histogram memory device 290 when a selection signal SLCT1 is low level. In a normal operation the selection signal SLCT1 is high level, thus signals applied to terminals 1, 3, 5, and 7 in the selector 291 are output to terminals of a write enable input terminal $\overline{WE}$, a chip select input terminal $\overline{CS}$ an address input terminal $\overline{ADD}$, and a data input terminal D$_{in}$ in the histogram memory device 290.

The circuit shown in FIG. 9 generates an upper address signal AD$_U$ supplied to the address signal synthesizing circuit 295, an operation enable signal OE, and an operation termination signal OT.

The circuit shown in FIG. 9 includes a register 270 storing the position of the origin (x$_0$, y$_0$) shown in FIG. 2, a comparator 271, an OR gate 272, and a counter 273 receiving a clock signal CK synchronized with the pixel position access. Thus, the counter 273 counts a position of the pixel whose histogram is to be calculated. When the position count value is within a suitable range, that is, the pixel position in question is within a suitable region, the comparator 271 outputs a high-level signal to the OR gate 272 to result in the operation enable signal OE, which is a significant high level. The operation enable signal OE is supplied to the SV controller 10 and signal input terminals EN in the counters 274 and 281 to enable the count of the counters.

The circuit shown in FIG. 9 further includes the counters 274 and 281, a register 275 storing m, a comparator 276, a register 277 holding m, a comparator 278, a counter 279, an adder 280, a register 282 holding (n·N), a comparator 283, a register 284 holding n, a comparator 285, and a counter 286.

The counter 274 counts up the clock signal CK and outputs a counted X direction signal $x_C$ to the comparator 276. The comparator 276 outputs a clear signal applied to a clear terminal of the counter 274 when $x_C \geq m$. Thus, the counted signal $x_C$ is periodically reset. When the counted value $x_C$ reaches m, the count value in the counter 279 is increased by one, the count value designating the suffix M of the segment $SEG_{M,N}$.

Similarly, the circuits 281 and 284 to 286 calculate the suffix N of the segment $SEG_{M,N}$.

Figures 10A, 10B:
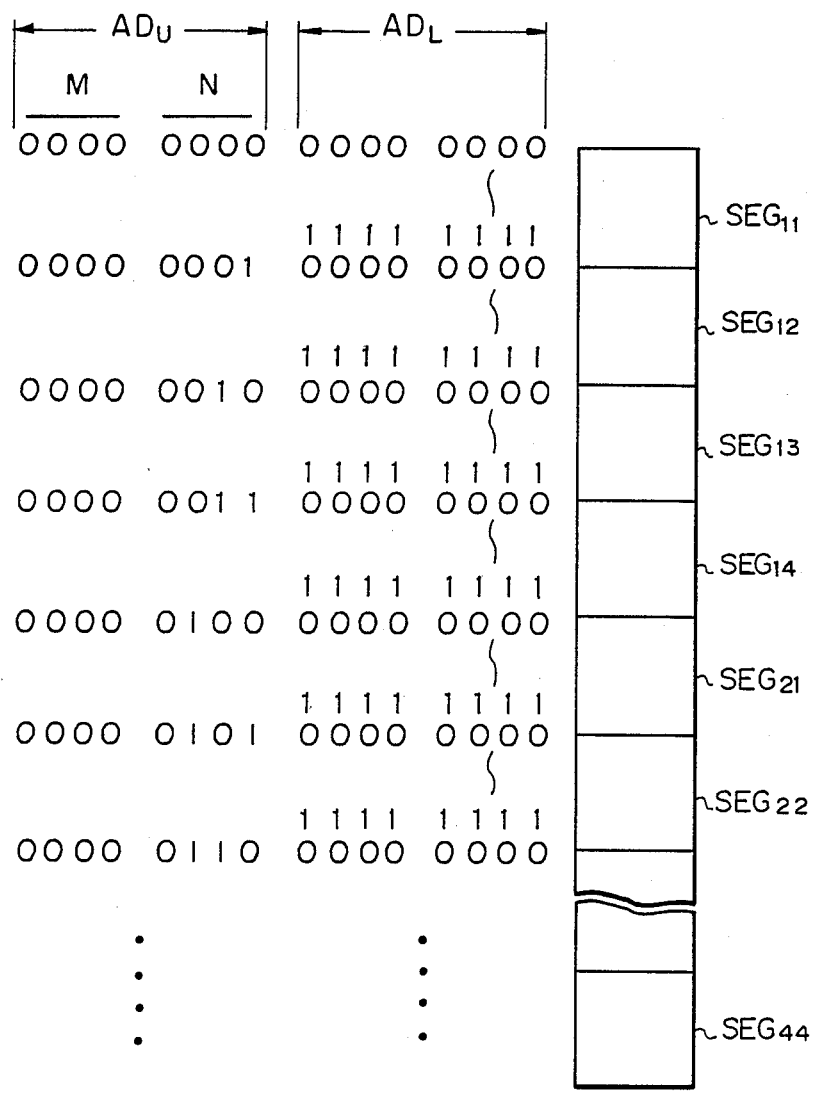
FIGS. 10a and 10b are views of an address consisting of upper and lower addresses $AD_U$ and $AD_L$, for accessing the histogram memory device shown in FIG. 8, and an array in the histogram memory device.

The adder 280 receives both subindices M and N and combines both to form the upper address $AD_U$ as shown in FIG. 10a.

When the countd value $y_C$ exceeds (n·N), the operation termination signal OT is output to the SV controller 10 to terminate the calculation. On the other hand, the density-degree of the image-input data signal $S_2$ defines the lower address $AD_L$ shown in FIG. 10a.

These upper and lower address signals $AD_U$ and $AD_L$ are combined to a single address signal by the address signal synthesizing circuit 295 and supplied to the histogram memory device 290. FIG. 10b is a schematic view of the data blocks corresponding to the segments $SEG_{11}$ to $SEG_{44}$.

Figure 11:
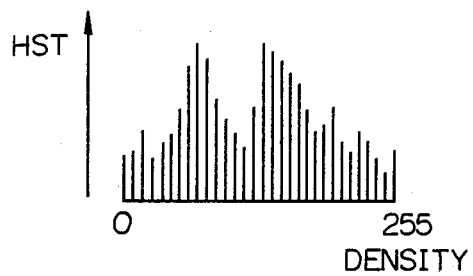
FIG. 11 is a graph of the histogram obtained by the density histogram calculation circuit shown in FIGS. 8 and 9.

Referring to FIG. 8, when the write enable signal $\overline{WE3}$ and the letter-pattern extracted signal $S_4$ exist, the memory content in the memory device 290 defined by the address signal $(AD_U + AD_L)$ is increased by one by means of the adder 292 and is stored in the memory device 290. If the same address signal is supplied to the memory device 290 under the existing write enable signal $\overline{WE3}$ the letter-pattern extracted signal $S_4$, the memory content in the address which corresponds to the same density is incremented,. As a result, the histogram, as shown in FIG. 11, is obtained for every segment in the histogram memory device 290.

The calculated histogram stored in the memory device 290 may be output to the area calculation circuit 7 shown in FIG. 1, which is realized by using the MPU, by way of the tristate buffer 296.

Figure 18:
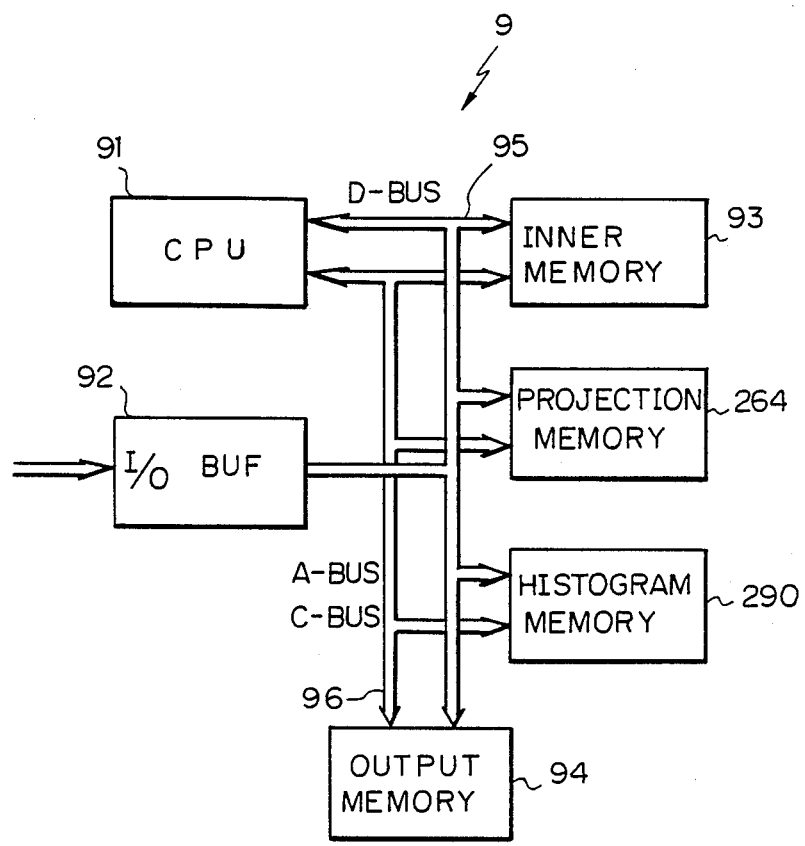
FIG. 18 is a block diagram of a microprocessor unit.

The histogram memory device 290 may be a part of the MPU, as shown in FIG. 18.

Referring back to FIG. 1, the circuit 6 for deciding the segment region to be judged or analyzed (an effective domain) will be explained. The circuit 6 includes a projection circuit 61 and a synthesizing circuit 62.

Figure 12A:
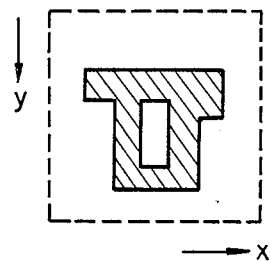
FIGS. 12a and 12b are graphs of a pattern to be projection-calculated by the projection calculation circuit 61 and a calculated projection result.
Figure 12B:
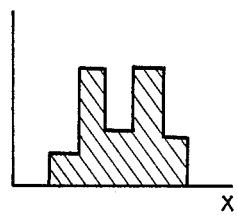

The projection circuit 61 obtains the number of pixels with high-level letter-pattern extracted signals by projection along the X direction for each pixel line in the Y direction in each segment. For example, when a pattern to be projected is as in FIG. 12a, the projection data as shown in FIG. 12b is obtained.

The projection circuit 61 will be explained in detail with reference to the synthesizing circuit 62.

Figure 13A:
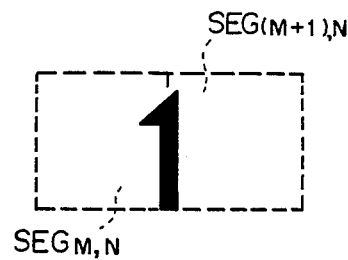
FIGS. 13a to 13d are views for explaining the operation of a synthesizing circuit shown in FIG. 1.
Figure 14:
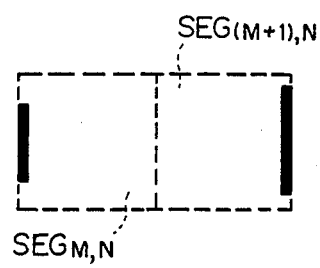
FIGS. 14 and 15 are views for explaining the operation of the synthesizing circuit.
Figure 13B:
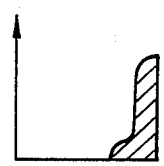
Figure 15:
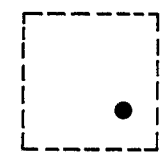
Figure 13C:
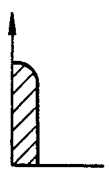
Figure 13D:
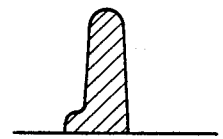

The synthesizing circuit 62 receives the projection data from the projection circuit 61. First, the synthesizing circuit 62 determines whether the projection data for one segment is on two consecutive segments as shown in FIG. 13a or is isolated as shown in FIGS. 14 and 15. In the letter pattern shown in FIG. 13a, the projection data in the segments $SEG_{M,N}$ and $SEG_{(M+1),N}$ are shown in FIGS. 13b and 13c, respectively. Thus, these projection data are synthesized into a single projection data as shown in FIG. 13d. The letter patterns shown in FIG. 14 are not synthesized, because the letter patterns in the segments $SEG_{M,N}$ and $SEG_{(M+1),N}$ are separate. The letter patterns in the segment $SEG_{M,N}$ may be synthesized to the letter pattern in the segment $SEG_{(M-1),N}$, if required. The synthesizing circuit 62 compares the number of the image data in the synthesized segments as shown in FIG. 13d or the number of raw image data corresponding to FIGS. 14 and 15 with a predetermined value and outputs the above number of synthesized or raw pattern image data when the number of image data is greater than the above-mentioned predetermined value. Thus, it neglects the pattern as shown in FIG. 15, which is small image-input data, as noise image-input data.

Figure 17:
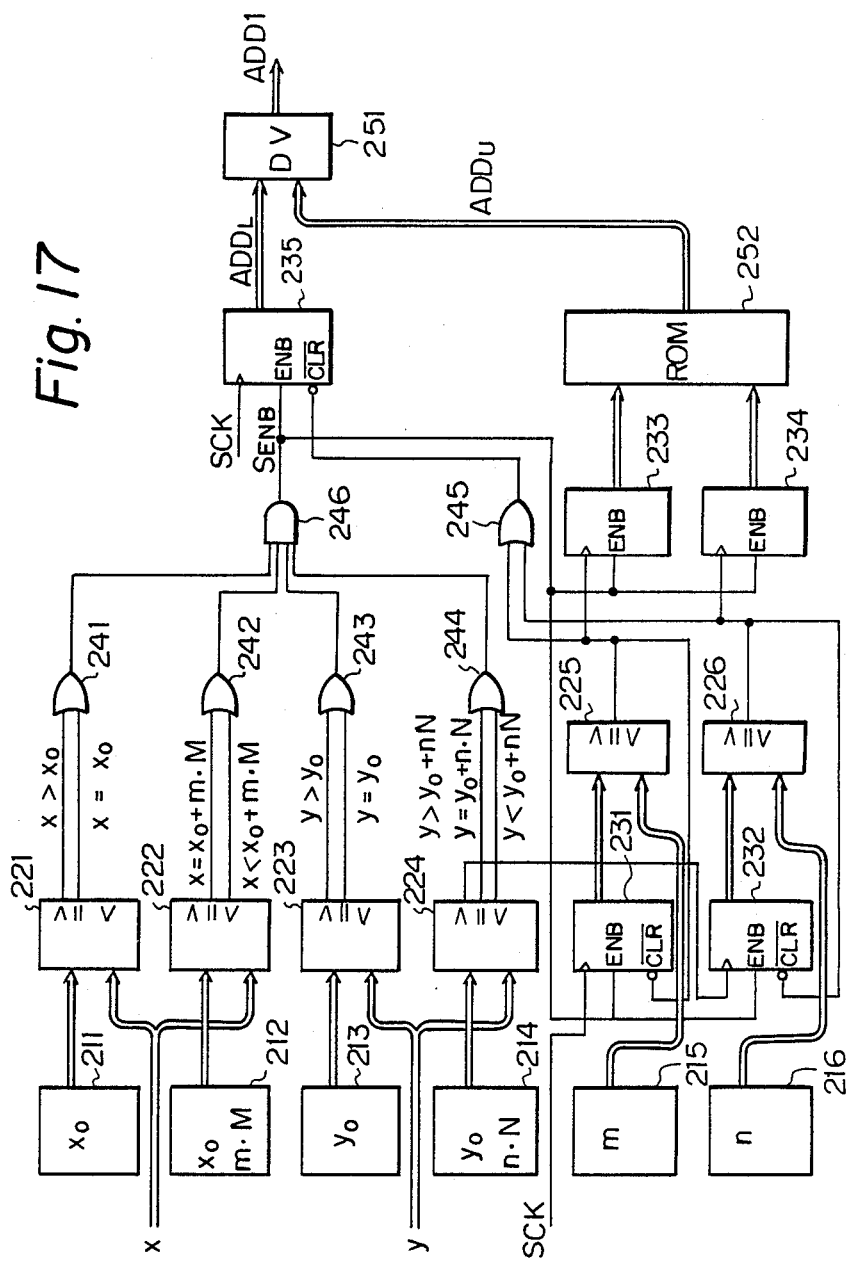

The projection circuit 61 and the synthesizing circuit 62 cooperate with each other to realize the above calculation. FIGS. 16 and 17 are circuit diagrams of the projection circuit 61. The synthesizing circuit 62 is realized by the MPU shown in FIG. 18.

The circuit shown in FIG. 16 includes an adder 261, a selector 263, a memory device 264, and a driver 253. The adder 261 receives the signal $S_4$ output from the letter pattern extraction circuit 4 and a signal output from the memory device 264 and adds both received signals. The selector 263 receives a set of signals including data DT1 output from the adder 261, a write enable signal $\overline{WE1}$ and chip select signal $\overline{CS1}$ output from the SV controller 10, and an address signal ADD1 and a set of signals including data DT2, a write enable signal $\overline{WE2}$ a chip select signal $\overline{CS2}$ and an address signal ADD2 output from the synthesizing circuit 62, i.e., the MPU. It outputs either set of received signals to a data input terminal $D_{in}$, a write enable signal input terminal $\overline{WE}$, a chip select signal input terminal $\overline{CS}$, and an address signal input terminal ADD in the memory device 264, in response to a selection signal SLCT1 output from the MPU 9.

The projection memory device 264 is connected to a data bus D-BUS, a control bus C-BUS and an address bus A-BUS of the MPU 9 by way of the driver 253 and the selector 263, as shown in FIGS. 16 and 18, and may be formed by part of the MPU 9, like the synthesizing circuit 62. The projection memory device 264 stores the independent projection data as shown in FIG. 13b when the letter pattern is independent in one segment and the synthesized projection data as shown in FIG. 13d when the letter pattern is on consecutive segments.

When the selection signal SLCT1 is high level, the projection data access operation is effected in response to the above-mentioned control signals $\overline{WE1}$, $\overline{ADD1}$, and $\overline{CS1}$. On the other hand, when the selection signal SLCT1 is a low level, the projection data access operation is effected in response to the control signals WE2 $\overline{ADD2}$, and $\overline{CS2}$. Therefore, the projection data stored in the projection memory device 264 is output to the synthesizing circuit 62 (formed by a part of the MPU 9).

The circuit shown in FIG. 17 is an address signal generation circuit generating the address signal ADD1 supplied to the projection memory device 264 through the selector 263. The address signal generation circuit consists of registers 211 to 216, comparators 221 to 226, counters 231 to 235, OR gates 241 to 245, an AND gate 246, a driver 251, and a read-only memory (ROM) 252. The register 211 holds the X-directional starting pixel position $x_0$ of the origin coordinate $(x_0, y_0)$ as shown in FIG. 2. The register 212 holds the right-end pixel position: $x_0 + m \cdot M$. The register 213 holds the Y-directional starting pixel position of the origin $(x_0, y_0)$. The register 214 holds the lower-end pixel portion in FIG. 2: $y_0 + n \cdot N$. The registers 215 nd 216 hold m and n, respectively.

The X-directional pixel position x indicating the absolute pixel position from the origin $x_0$ is supplied to the comparators 221 and 222. When $x \geq x_0$, the comparator 221 outputs high-level logical signals to the OR gate 241. When $x \leq x_0 + m \cdot M$, the comparator 222 outputs high-level logical signals to the OR gate 242. The Y-directional position signal y indicating the absolute pixel position from the origin 10 is also supplied to the comparators 223 and 224, whereupon high-level logical signals are output from the comparator 223 to the OR gate 243 when $y \geq y_0$ and from the comparator 224 to the OR gate 244 when $y \leq y_0 + n \cdot N$. Output signals from the OR gates 241 to 244 are supplied to the AND gate 246, thus the AND gate 246 outputs an enable signal $S_{ENB}$, which has a high level, to enable counting of a check signal SCK in the counters 231 to 235 when $x_0 \leq x \leq x_0 + m \cdot M$ and $y_0 \leq y \leq y_0 + m \cdot M$, that is, the coordinate (x,y) is on the segments shown in FIG. 2.

The data synchronizing clock signal SCK is supplied to the counters 231 and 235. The data synchronizing clock signal SCK is used to generate the coordinate signals x and y in synchronization with the data read timing of the memory device 3. The memory access is effected from the top horizontal line, i.e., X direction, on the plane in FIG. 2 to the bottom horizontal line.

The counter 231 counts the clock signal SCK and outputs a counted value to the comparator 225. The comparator 225 outputs a high-level signal to inverted clear terminals $\overline{CLR}$ in the counters 231 and 235 and to an input terminal of the counter 233 when the counted value coincides with m. Thus, the counters 231 and 235 are cleared and the counter 233 counts up by one. The counter 232 counts the number of horizontal lines by the output signal from the comparator 224 and outputs a counted value to the comparator 226. The comparator 226 outputs a high-level signal to the inverted clear terminals $\overline{CLR}$ of the counters 232 and 235 and to an input terminal of the counter 234.

The count value in the counter 233 represents an X-directional position of the segment in FIG. 2, that is, the count value designates M. The count value in the counter 234 designates N. The count values in the counters 233 and 234 indirectly define the memory area of the segment $SEG_{M,N}$ in the memory device 264, where M=0 to M-1 and N=0 to N-1. These counted values are supplied to the ROM 252 and are converted into an upper address signal $ADD_U$ directly defining the memory area of the segment $SEG_{M,N}$ in the memory device 264.

The counter 235 counts the data synchronizing signal SCK, however, clears a counted value upon receiving the clear signals from the comparators 225 and 226 by way of the OR gate 245.

A lower address signal $ADD_L$, which is the counted value in the counter 235, represents a lower address for direct access within the memory area defined by the upper address signal $ADD_U$. The address signals $ADD_U$ and $ADD_L$ form the address signal $ADD_1$, which is applied to the memory device 264 through the driver 251 and the selector 263.

FIG. 18 is a block diagram of the MPU 9. The MPU 9 includes a central processing unit (CPU) 91, an I/O buffer 92, an inner memory device 93, and an output memory device 94. These devices are connected with a data bus (D-BUS) 95 and address and control buses (A-BUS, C-BUS) 96. The MPU 9 is connected to the projection memory device 264 and the histogram memory device 290 by way of the data, address, and control buses. The projection memory device 264 and the histogram memory device 290 may be formed as part of the MPU 9, as mentioned before. The I/O buffer 92 functions as an interface unit for inputting signals from and/or outputting signals to the SV controller 10 and other circuits.

The CPU 91 functions as the synthesizing circuit 62, the area calculation circuit 7, and a part of the judgement circuit 8. Thus, these circuits are referred to as "means" for convenience in the following description.

Figure 19:
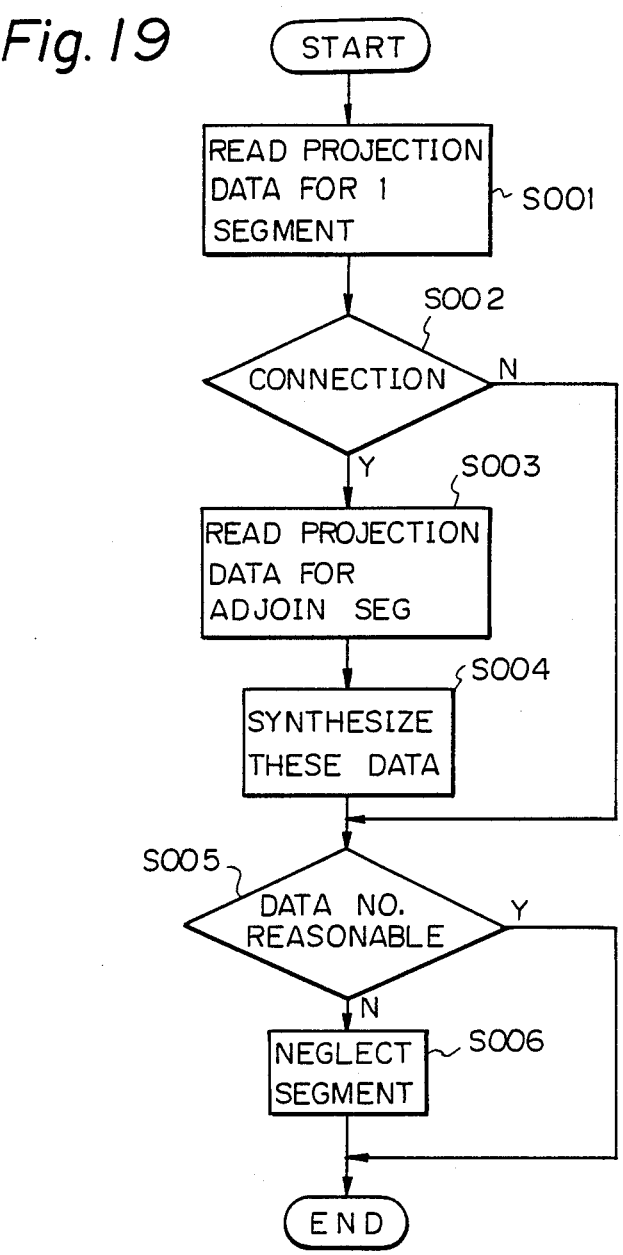
FIG. 19 is a flow chart explaining the function of the synthesizing circuit.

FIG. 19 is a flow chart explaining the function of the synthesizing means 62 as accomplished by the MPU 9. As mentioned before, the synthesizing means 62 reads the projection data for one segment (step 1: S001) and checks for connection of the letter patterns on two adjoining segments (S002). When the letter patterns on adjoining segments form a single pattern, the means 62 reads again the projection data on the adjoining segments and synthesizes projection data (S003 and S004). The synthesizing means 62 further checks the total number of projection data (S005) and outputs effective letter patterns, i.e., letter patterns which have a number of projection data equal to or greater than a predetermined value. Letter patterns which have a number of projection 1 data smaller than the predetermined value are neglected as invalid data at the following steps of signal processing.

Figure 20:
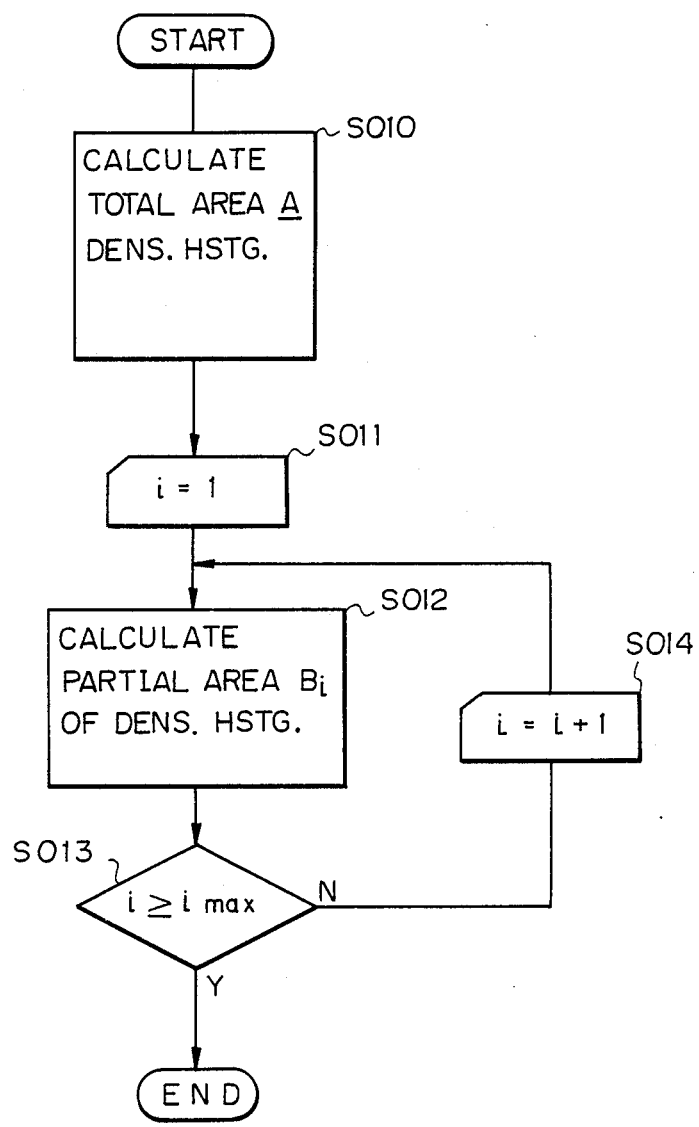
FIG. 20 is a flow chart showing the function of an area calculation circuit shown in FIG. 1.
Figure 21A:
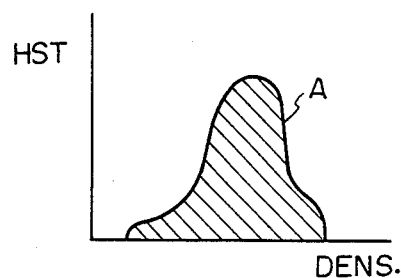
FIGS. 21a to 21d are graphs explaining the operation of the area calculation circuit.
Figure 21B:
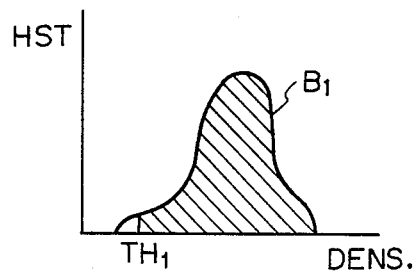
Figure 21C:
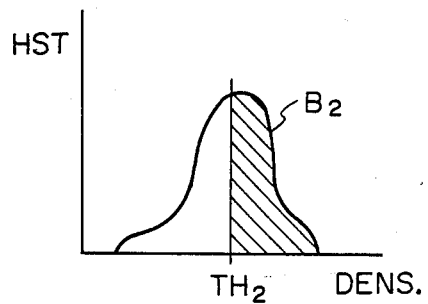
Figure 21D:
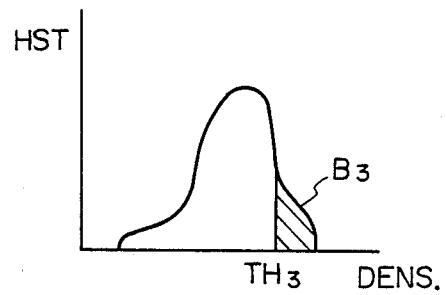

The area calculating means 7 will now be explained referring to FIG. 1. The area calculating means 7 is realized by the MPU 9 in this embodiment. FIG. 20 is a flow chart of the area calculating means 7 in the MPU 9. The area calculating means 7 calculates a total area $A_{M,N}$ and partial area $B_{(M,N)i}$ of the histogram obtained by the histogram calculation circuit 5 for every effective segment which is determined at the synthesizing means 62. FIGS. 21a to 21d are histogram curves of an effective segment. First, the means 7 calculates the total area $A_{M,N}$, as shown by the shading in FIG. 21a (step S010). After that, the means 7 calculates the partial area $B_{(M,N)i}(i=1, 2, 3)$, as shown by the shading in FIGS. 21b to 21d, with the density histogram threshold values $TH_1$ to $TH_3$.

The area calculation is effected not only for every effective segment but also for the adjoining effective segments when letter patterns divided by segment boundaries are synthesized.

Figure 22:
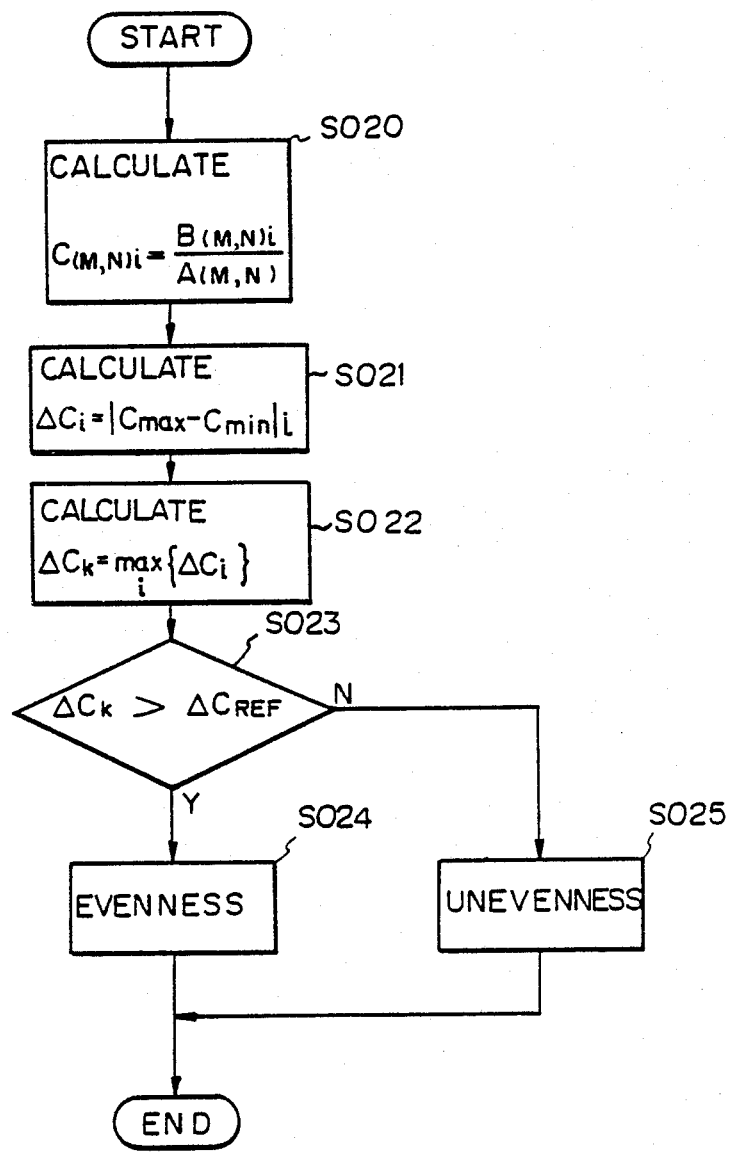
FIG. 22 is a flow chart showing the function of an evenness judgement calculation circuit.

The judgement means 8 will now be explained referring back to FIG. 1. The judgement means 8 includes an evenness judgement circuit 81 and a register 82 holding a reference deviation of evenness $\Delta C_{REF}$. The evenness judgement circuit 81 is also realized by the MPU 9 shown in FIG. 18 in this embodiment. FIG. 22 is a flow chart of the evenness judgement means 81.

The evenness judgement means 81 receives the total area data $A_{(M,N)}$, where M and N are subindices for designating the segments in FIG. 2, and the partial area data $B_{(M,N)i}$ and calculates evenness ratios $C_{(M,N)i}$ for every segment and for every threshold level by the following equation:

$$C_{(M,N)i} = \frac{B_{(M,N)i}}{A_{(M,N)}} \quad (2)$$

Figure 23A:
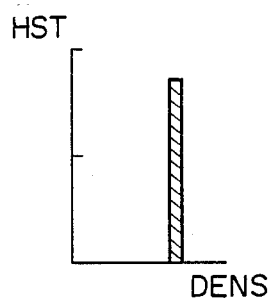
FIG. 23a to 23c are graphs of histograms.
Figure 23B:
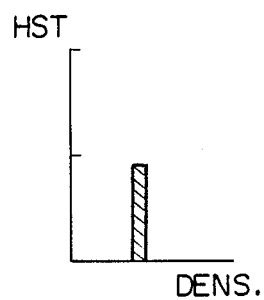
Figure 23C:
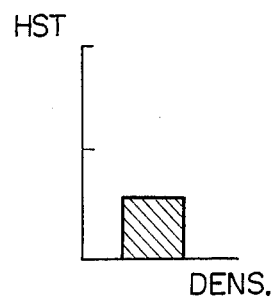

Note that the above signal processing steps involve normalization of the density histogram in every effective segment, i.e., relative-type density and evenness calculation. FIGS. 23a to 23c and FIGS. 24a to 24d are provided to clarify the concept, FIGS. 23a to 23c showing various types of histogram graphs and FIGS. 24a to 24d showing evenness ratio graphs. In FIGS. 23a to 23c and 24a to 24d, the abscissas indicate density. In FIGS. 23a to 23c, the ordinates indicate the histogram (HST). In FIGS. 24a to 24d, the ordinates indicate the evenness ratio C.

Figure 24A:
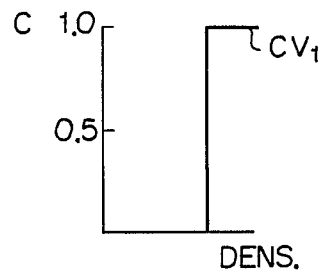
FIGS. 24a to 24d are graphs of evenness coefficients.
Figure 24B:
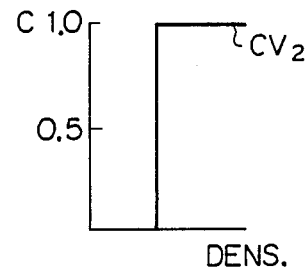
Figure 24C:
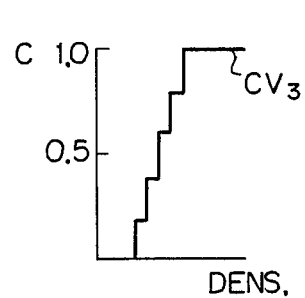
Figure 24D:
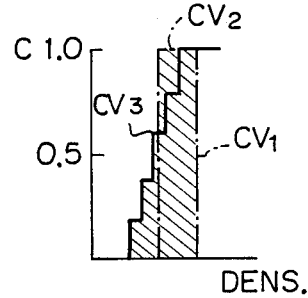

In FIG. 24d, curves $CV_1$ to $CV_3$ are combined to form an envelope for defining a shaded portion. Note that the shaded portion includes unevenness of density, explained later.

The calculated ratios $C_{(M,N)i}$ are stored in the inner memory 93 shown in FIG. 18 in a manner as shown in FIGS. 25a to 25c (step S020 in FIG. 22). After that, the evenness judgement means 81 calculates deviations $\Delta C_i$ for these ratios (S021) by the following equation:

$$\Delta C_i = |C_{max} - C_{min}|_i \quad (3)$$

and calculates a deviation $\Delta C_k$ for these deviations $\Delta C_i$ (S022) by the following equation:

$$\Delta C_k = \max_i \{\Delta C_i\} \quad (4)$$

The evenness judgement means 81 compares the deviation $\Delta C_k$ with the reference deviation $\Delta C_{REF}$ stored in the register 82 (S023) and outputs an evenness signal when $\Delta C_k \geq \Delta C_{REF}$ (S024) or an unevenness signal when $\Delta C_k < \Delta C_{REF}$ (S025).

As mentioned above, the above apparatus detects relatively the evenness of the printed letter-pattern density in the entire region under consideration.

By, basically, dividing the entire region into a plurality of segments and by additionally, combining the portions of a letter pattern placed on adjoining segments into one, the evenness of the density of one letter pattern can be reliably determined. In addition, the total relative evenness of density for several letter-patterns can also be determined. The total evenness is not affected by changes of illumination for reading the image-input data or by noise.

The above division of the region into a plurality of segments contributes to higher processing speeds.

The memory 3 is not essentially for realizing the above calculation, thus it can be omitted.

The apparatus does not essentially require the reference density or the reference evenness patterns for comparing all letter-patterns to be detected, which may consist of numerous density data. This eliminates troublesome work for setting and adjusting reference data.

Figure 26:
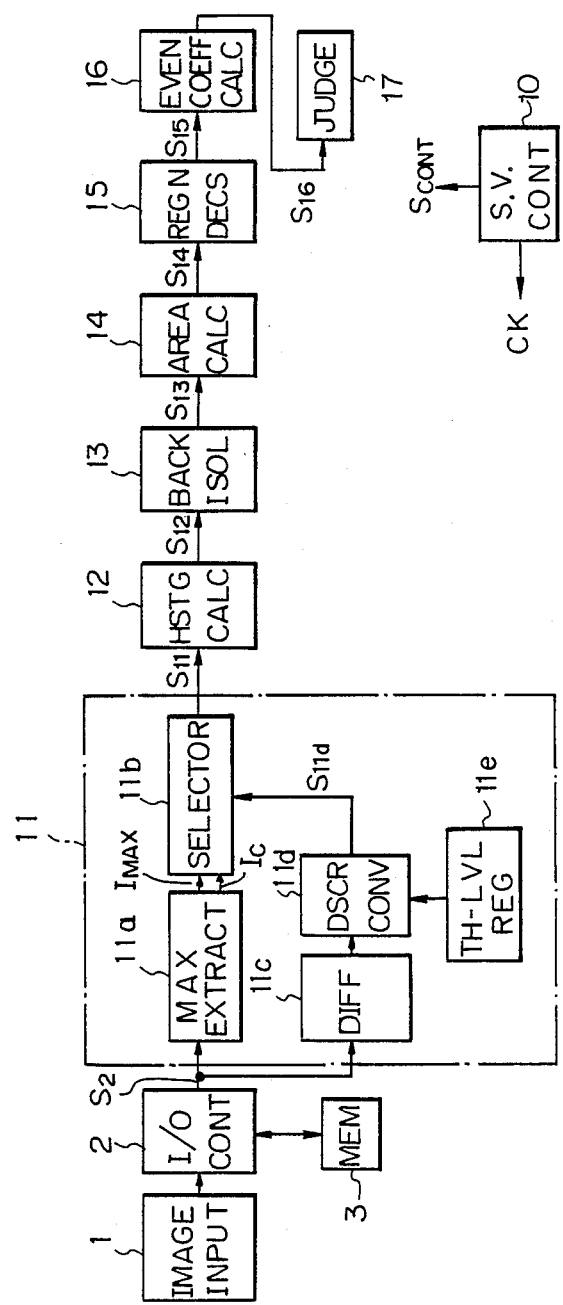
FIG. 26 is a block diagram of another embodiment of an apparatus for detecting the density and evenness of printed patterns in accordance with the present invention.

FIG. 26 is a block diagram of another embodiment of an apparatus for detecting density and evenness of printed patterns in accordance with the present invention. In FIG. 26, the apparatus includes an image-input device 1, an I/O controller 2, a memory device 3, and an SV controller 10. The apparatus further includes a circuit 11 for enhancing edges of the letter patterns to be investigated, a density histogram calculation circuit 12, a circuit 13 for isolating background data, an area calculation circuit 14, a circuit 15 for deciding effective segments to be investigated, a circuit 16, for calculating evenness coefficient, and a judgement circuit 17.

The image-input device 1, the I/O controller 2, and the memory device 3 are basically identical to those shown in FIG. 1, thus descriptions thereof are omitted. The SV controller 10 is similar to the SV controller 10 shown in FIG. 1.

The letter-pattern edge-enhancement circuit 11 includes a maximum-value extracting circuit 11a, a selector 11b a differential circuit 11c, a discriminating-converting circuit 11d, and a register 11e holding a threshold value for discriminating a differential value output from the differential circuit 11c.

Figure 27:
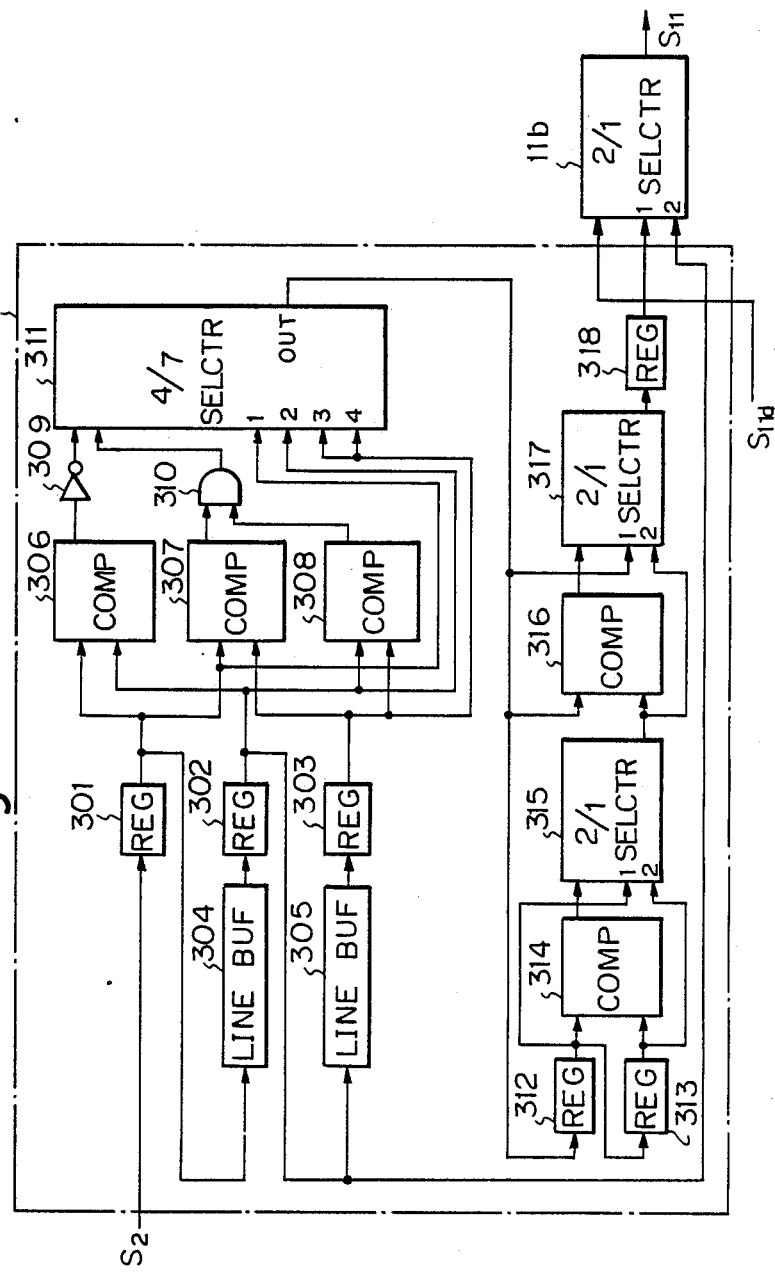
FIG. 27 is a circuit diagram of a maximum value extracting circuit and selector in FIG. 26.

FIG. 27 is a circuit diagrams of the maximum-value extracting circuit 11a and the selector 11b. The maximum-value extracting circuit 11a includes registers 301 to 303, line buffers 304 and 305, comparators 306 to 308, an inverter 309, and AND gate 310, and a four-to-one (4/1) selector 311. The maximum-value extracting circuit 11a further includes registers 312 and 313, a comparator 314, a two-to-one (2/1) selector 315, a comparator 316, a 2/1 selector 317, and a register 318.

The register 301 continuously receives the image-input data, each piece of which has a density-degree for a pixel, with the clock pulse output from the SV controller 10. Each of registers 301 to 303, 312, 313, and 318 has a length of eight bits for holding eight-bit density-degree data. The line buffers 304 and 305 have the same construction as the line buffers 103 and 104 shown in FIG. 5. The comparators 306 to 308, 314, and 316 have the same construction and compare sets of eight-bit data.

FIG. 28 is a view of the image-input data array with respect to density-degree data at a center pixel to be calculated. The maximum-value extracting circuit 11a seeks a maximum density-degree value from the density-degree data at the center pixel, $F_{i,j}$, and density-degree data at peripheral pixels thereof, $F_{i-1,j-1}$ to $F_{i+1,j+1}$ (except $F_{i,j}$), and outputs the maximum density-degree value to the selector 11b.

The operation of the maximum-value extracting circuit 11a will now be explained in more detail.

The registers 301 to 303 synchronously receive a set of column density-degree data $F_{i-1,j-1}$, $F_{i-1,j}$, and $F_{i-1,j+1}$; $F_{i,j-1}$, $F_{i,j}$, and $F_{i,j+1}$; and $F_{i+1,j-1}$, $F_{i+1,j}$, and $F_{i+1,j+1}$ with each clock signal. The comparators 306 to 308 receive the set of column density-degree data simultaneously, compare the respective density-degree data, and output selection signals to the selector 311 through the inverter 309 and the AND gate 310. The selector 311 also receives the set of column density-degree data and outputs maximum density-degree data from the column density-degree data in response to the selection signals. The maximum density-degree data in each column is consecutively extracted and supplied to the register 312, the comparator 316, and the selector 317. The circuits 312 to 317 extract maximum density-degree data from the maximum density-degree data for the respective columns.

The maximum density-degree data of the density-degree data shown in FIG. 28 is supplied to the selector 11b. At the same time, the density-degree data on the center pixel $F_{i,j}$ output from the register 302 is applied to the selector 11b.

The differential circuit 11c, the discriminating-converting circuit 11d, and the register 11e are substantially identical to those shown in FIG. 5 and mentioned before in the first embodiment. Therefore, a signal $S_{11d}$ output from the discriminating-converting circuit 11d is high level when the differential value of the density-degree data $F_{i,j}$ at the center pixel is higher than a predetermined value stored in the register 11e.

The selector 11b receives the signal $S_{11d}$ and outputs either the maximum density-degree data MX output from the register 318 or the density-degree data $F_{i,j}$ at the center pixel in response to the following equation for the emphasized value $G_{i,j}$ for the center pixel in question as shown in FIG. 29:

$$G_{i,j} = F_{i,j}, \text{ when } S_{11d} = \text{low} \qquad (5)$$

$$MX, \text{ when } S_{11d} = \text{high}$$

Figure 30A:
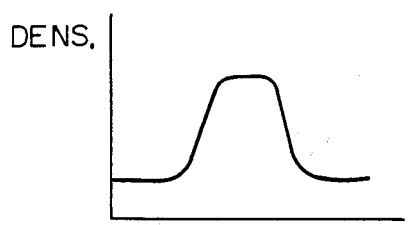
FIGS. 30a and 30b are curves explaining the operation of an enhancement circuit shown in FIG. 26.
Figure 30B:
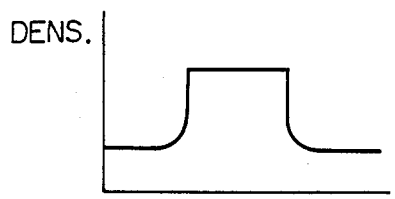

With the edge-enhancement circuit 11, when the image-input data is given as shown in FIG. 30a, the enhanced data as shown in FIG. 30b is output.

Figure 31:
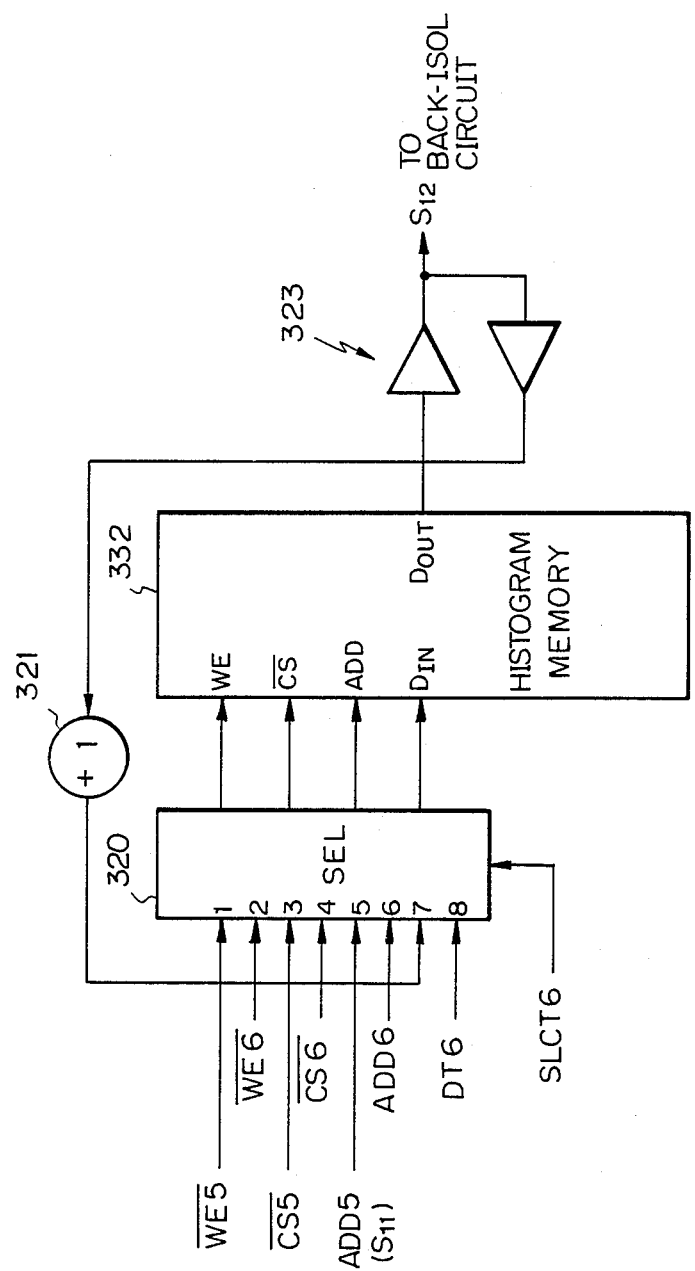
FIG. 31 is a circuit diagram of a density histogram calculation circuit shown in FIG. 26.

Referring back to FIG. 26, the density histogram calculating circuit 12 calculates the histogram for the density, i.e., the density-degree of every segment region, from the enhanced image-input data $S_{11}$. FIG. 31 is a circuit diagram of the histogram calculating circuit 12. The circuit shown in FIG. 31 consists of a selector 320, an adder 321, a histogram memory 322, and a tri-state buffer 323, which are basically identical to those in FIG. 8. A write enable signal $\overline{WE5}$ and a chip select signal $\overline{CS5}$ are output from the SV controller 10. An address signal ADD5 consisting of a higher address signal $ADD_U$, which may be produced at a circuit (not shown) similar to the circuit shown in FIG. 9 in a similar way, and a lower address signal $ADD_L$, which is same to the density-degree signal $S_{11}$ output from the edge-enhancement circuit 11. Note that the write enable signal $\overline{WE5}$ is directly supplied to the selector 320. This differs from the circuit shown in FIG. 8.

A write enable signal $\overline{WE6}$, a chip select signal $\overline{CS6}$, an address signal ADD6, data DT6, and a selection signal SLCT6 are applied from an MPU, which may be the MPU 9 shown in FIG. 18 and will be explained later in detail.

Referring to FIG. 26, the background data isolating circuit 13, the area calculation circuit 14, the effective segment region decision circuit 15, the evenness coefficient calculation circuit 16, and the judgement circuit 17 will be explained. In the embodiment, these circuits are realized by the MPU 9 as shown in FIG. 18 and thus are referred to as "means" in the following description.

Figure 32:
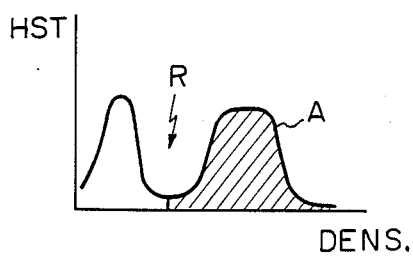
FIG. 32 is a curve explaining the operation of a background data isolation circuit shown in FIG. 26.

The background data isolating means 13 first investigates an envelope of the density histogram curve obtained by the density histogram calculation circuit 12 by, for example, calculating the change of rate of the histogram with density. Second, the background data isolating means 13 detects a recess portion, for example, a portion R in FIG. 32. After that, the background data isolating means 13 ignores histogram data, for example, appearing as a blank portion in FIG. 32. The shaded portion in FIG. 32 is considered as suitable density histogram data for use in the following steps. The blank portion in FIG. 32 is considered as low-density data or noise data not suitable for use in judging the evenness. Note that the recess does not always exist as shown in FIG. 30b.

The area calculation means 14 calculates the total area $A_{MN}$ of the effective histogram shown by the shading lines for every segment which may be considered effective as mentioned before. The above M and N are subindices designating segment portions.

Figure 33:
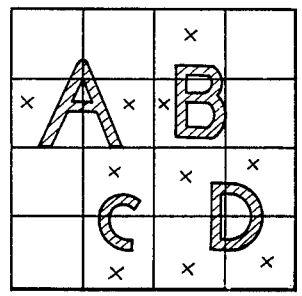
FIG. 33 is a map explaining the operation of an effective segment decision circuit shown in FIG. 26.

The effective segment region decision means 15 discriminates effective segments as marked by crosses in FIG. 33, which segments have a predetermined number of effective pixel data, with reference to the total area $A_{MN}$.

The evenness coefficient calculation means 16 calculates the evenness coefficient $CC_{(M,N)i}$ as defined by equation (2) for every segment determined by the effective segment region decision means 15.

The judgement means 17 first produces deviations $\Delta CC_i$ as defined by equation (3), in all effective segments. Second, the judgement means 17 produces a unique deviation $\Delta R$, i.e., the maximum deviation in all the deviations $\Delta CC_i$. After that, the judgement means 17 outputs an evenness signal when the maximum deviation $\Delta R$ is smaller than a predetermined reference value $\Delta R_{REF}$ stored in the MPU. Otherwise, the judgement means 17 outputs an unevenness signal.

The apparatus shown in FIG. 26 can detect evenness substantially as reliably as the apparatus shown in FIG. 1. The apparatus shown in FIG. 26 has the advantage of simpler construction compared to the apparatus shown in FIG. 1. While the maximum extraction circuit 11a is somewhat more complex than the discriminating-converting circuit 42 and the register 41, the projection circuit 61 and the synthesizing circuit 62, both of which require considerably complex circuits, are omitted. In this regard, the apparatus shown in FIG. 26 has a further advantage of higher processing speed, because, in the apparatus shown in FIG. 1, signal processing in the projection circuit 61 and the synthesizing circuit 62 must be repeated when are letter patterns to be synthesized. Other components in the apparatus in FIG. 26 are comparable to those in FIG. 1 in circuit construction and signal processing speed.

Figure 34:
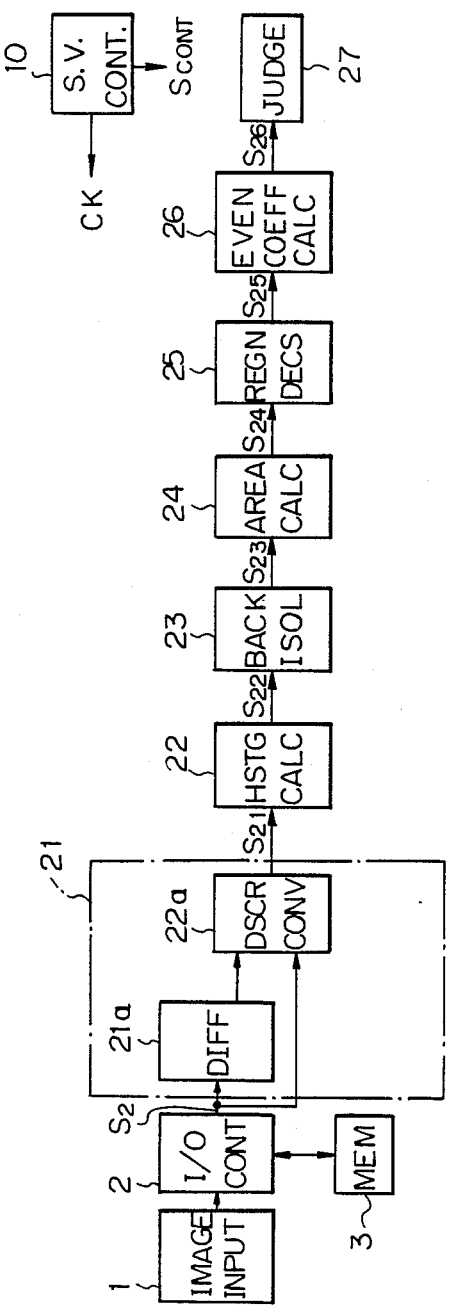
FIG. 34 is a circuit diagram of still another embodiment of an apparatus for detecting the density and evenness of printed patterns in accordance with the present invention.

FIG. 34 is a block diagram of still another embodiment of an apparatus for detecting density and evenness of printed patterns in accordance with the present invention.

In FIG. 34, the apparatus includes an image-input device 1, an I/O controller 2, a memory device 3, and an SV controller 10, which are substantially identical to the elements bearing the same reference in FIGS. 1 and 26 and thus are not described in detail.

The apparatus further includes a circuit 21 for extracting evenness (or deleting edge portion data), a density histogram calculation circuit 22, a circuit 23 for isolating background data, an area calculation circuit 24, a circuit 25 for determining effective segments to be investigated, a circuit 26 for calculating an evenness coefficient, and a judgement circuit 27.

Figure 35:
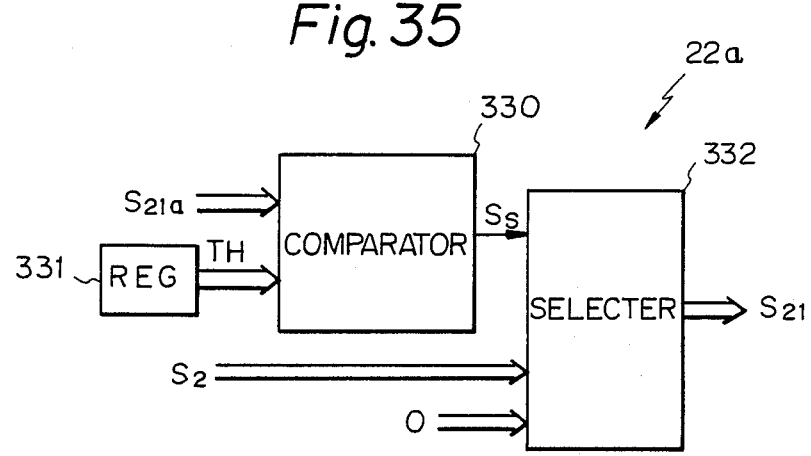
FIG. 35 is a circuit diagram of a discriminating-converting circuit shown in FIG. 34.

The evenness extracting circuit 21 consists of a differential circuit 21a and a discriminating-converting circuit 22a. The differential circuit 21a is substantially identical to that shown in FIG. 5, so has a filtering feature as schematically illustrated in FIGS. 6a and 6b. FIG. 35 is a circuit diagram of the discriminating-converting circuit 22a formed with an eight-bit comparator 330, a register 331 holding a threshold value TH, and a selector 332.

The operation of the evenness extracting circuit 21 will be explained immediately below.

Figure 36A:
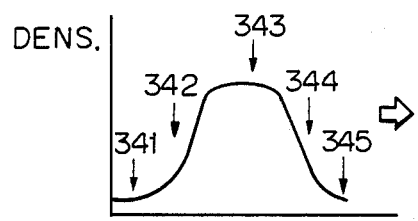
FIG. 36a and 36b are graphs explaining the operation of a density-evenness extraction circuit shown in FIG. 34.
Figure 36B:
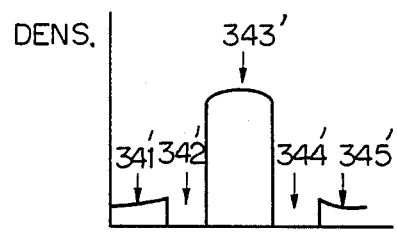

FIG. 36a is a graph showing one-dimensional density data to be processed. The differential circuit 21a calculates a differential value $S_{21a}$ of density data with respect to a certain center pixel, which is continuously shifted. The differential value $S_{21a}$ naturally has an absolute large value at slope portions 342 and 344, which may be edge portions of the letters. The differential value $S_{21a}$ is output to the comparator 330. The comparator 330 compares the differential value $S_{21a}$ with the threshold value TH and outputs a selection signal $S_S$ to the selector 332 when the differential value $S_{21a}$ is greater than the threshold value TH. The selector 332 receives the image-input signal $S_2$ from the memory device 3 by way of the I/O controller 2 and a constant 0 corresponding to zero density. The selector 332 outputs the received image-input data when the section signal $S_S$ is significant low level, i.e., the differential value $S_{212}$ is smaller than the threshold value TH. The selector 332 outputs constant data. As a result, an output signal of the evenness extracting circuit 21 distinguishes the density difference as shown in FIG. 36b. In FIG. 36b, it will be clearly understood that the portion 343' indicates a valid letter-pattern portion, portions 341' and 345' are background noise portions, and portions 342' and 345' are portions of the letter pattern.

Referring again to FIG. 34, the density histogram calculation circuit 22, the background data isolating circuit 23, the area calculation circuit 24, the effective segment determining circuit 25, the evenness coefficient calculation circuit 26, and the judgement circurt 27 are substantially identical to elements 12 to 17 in FIG. 26, respectively. Accordingly, subsequent processing is effected in a similar way as mentioned with reference to FIG. 26.

The judgement circuit 27 calculates deviations $\Delta C_i$ by the above equation (3) and also calculates a summation $\Delta C_{SUM}$ for these deviations by the following equation:

$$\Delta C_{SUM} = \sum_i \Delta C_i \qquad (6)$$

The judgement circuit 27 determines either evenness or unevenness of the density in response to the summation $\Delta C_{SUM}$, that is the judgement circuit 27 outputs an evenness signal when the summation $\Delta C_{SUM}$ is smaller than a predetermined value, otherwise, an unevenness signal. Consequently, the same judgement on the evenness of density as that set forth above is performed.

A comparison will show the circuit construction in FIG. 34 is much simpler than that in FIG. 26 as the maximum data extraction circuit 11a, illustrated in detail in FIG. 27, is omitted. This results in an improved processing speed.

The processing speed may be further significantly improved by applying pipeline control means to the MPU in the above embodiments.

In the above embodiments, digital signal processing is used for achieving the objectives, however, analog signal processing may naturally also be used.

Many widely different embodiments of the present invention may be constructed without departing from the spirit and scope of the present invention. It should be understood that the present invention is not limited to the specific embodiments described in this specification, except as defined in the appended claims.

We claim

1. An apparatus for evaluating density and eveness of patterns printed on an article comprising:
   means for receiving a plurality of image data representing said patterns which are divided into a plurality of segments and for calculating the density distribution of image data in each segment;
   means for determining effective segments which are segments that comprises valid data and for normalizing said density distribution of each effective segment; and
   means for quantifying the density and evenness of said patterns printed on said article on the basis of density distributions normalized by said normalizing means.

2. An apparatus according to claim 1, wherein said density distribution calculating means includes:
   a differential circuit receiving said plurality of image data in each segment and producing differential values thereof;
   a discriminating-converting circuit receiving said differential values, discriminating the received differential values with a predetermined value, and converting the received differential values into a specific value in repsonse to said discrimination;
   a circuit for extracting a maximum value of the image data placed on adjacent sections to the center portion;
   a selector receiving the maximum value and the image datum at the center portion and outputting either one of the received data in response to the output signal from the discriminating-converting circuit; and
   means for calculating a density histogram of the image data.

3. An apparatus according to claim 2, wherein said normalizing means includes:
   means for isolating background data included in the density histogram output from said density histogram calculating means;
   means for calculating a total effective area A of the density histogram whose isolated background data is by said background isolating means and partial effective areas $B_i$ of said density histogram with reference to a predetermined value; and
   means for calculating ratios $C_i = B_i/A$ representing density evenness in the effective segments.

4. An apparatus according to claim 3, wherein said normalizing means further includes a circuit, between said area calculating means and said density evenness calculating means, for finding effective segments with reference to the respective total area A so as to effect the calculation of said ratio for only effective segments at the density evenness calculating means.

5. An apparatus according to claim 1, wherein said density distribution calculating means includes:
   a differential circuit receiving said plurality of image data in each segment and producing differential values thereof;
   a discriminating-selecting circuit receiving said differential value and the image data, comparing the received differential value with a predetermined value, and outputting either the image data or a constant value in response to said compared output; and
   means for calculating a density histrogram of the image data.

6. An apparatus according to claim 5, wherein said normalizing means includes:
   means for isolating background data included in the density histogram output from said density histogram calculating means;

means for calculating a total effective area A of the density histogram whose the background data is isolated by said background isolating means and partial effective areas $B_i$ of said density histogram with reference to predetermined values; and means for calculating ratios $C_i=B_i/A$ representing density evenness in the effective segments.

7. An apparatus according to claim 6, wherein said normalizing means further includes a circuit, between said area calculating means and said density evenness calculating means, for finding effective segments with refernce to the respective total area A so as to effect the calculation of said ratio for only effective segments at the density evenness calculating means.

8. An apparatus according to claim 1, wherein said apparatus further includes means for evaluating the density and evenness of the patterns on the basis of said quantified value at said quantifying means.

9. An apparatus according to claim 1, wherein said apparatus further includes means for grouping said plurality of image data into segment data.

10. An apparatus according to claim 1, wherein said apparatus further includes an image input means.

11. An apparatus for evaluating density and evenness of patterns printed on an article comprising:

means for receiving a plurality of image data representing said patterns which are divided into a plurality of segments;

means for calculating the density distribution of plurality of image data in each segment;

means for normalizing said density distribution with an area of effective image data in each segment; and means for quantifying the evenness of the patterns on the basis of said normalized density distributions;

wherein said density distribution calculating means includes a differential circuit receiving said plurality of image data in each segment and producing differential values thereof;

a first discriminating-converting circuit receiving said differential values, discriminating the received differential values with a predetermined value, and converting the received differential values into a specific value in response to said discrimination;

a second discriminating-converting circuit receiving said plurality of image data in each segment, discriminating the received image data with a predetermined value, and converting the received image data into a specific value in response to said discrimination;

a circuit for finding an effective domain of the printed patterns by synthesizing signals output from said first and second discriminating-converting circuits; and means for calculating a density histogram of the image data with reference to the effective domain.

12. An apparatus according to claim 11, wherein said normalizing means includes:

means for deciding effective segments on the basis of the found effective domain;

means for calculating a total effective area A of the density histogram of said effective segments decided at said effective segment deciding means and partial effective areas $B_i$ (i=1, 2, ..., N) of said density histogram with reference to predetermined values; and means for calculating ratios $C_i=B_i/A$ representing density evenness in each effective segment.

13. An apparatus according to claim 12, wherein said effective segment deciding means includes cooperative projection data calculation means and synthesizing means, said projection data calculation means counting the number of the image data in the effective segment, said synthesizing means synthesizing adjoining segments on the basis of said projection data counted at said projection data calculation means.

14. An apparatus according to claim 4, wherein said density distribution calculation means further includes a delay circuit, disposed between said second discriminating-converting circuit and said synthesizing circuit, for delaying the signal output from the second discriminating-converting circuit a predetermined time to synchronize it with the signal output from the first discriminating-converting circuit at input terminals of the synthesizing circuit.

15. An apparatus according to claim 4, wherein said apparatus further includes a memory device for storing said image data into segment areas in the memory.

* * * * *